United States Patent [19]

Suzuki

[11] Patent Number: 4,787,050

[45] Date of Patent: Nov. 22, 1988

[54] APPARATUS FOR MANAGING SOFTWARE BENDING MACHINES

[75] Inventor: Takamitsu Suzuki, Nagoya, Japan

[73] Assignee: Brother Industries, Ltd., Japan

[21] Appl. No.: 930,332

[22] Filed: Nov. 12, 1986

[30] Foreign Application Priority Data

Nov. 12, 1985 [JP] Japan ........................ 60-253352

[51] Int. Cl.[4] ........................ G06F 15/21

[52] U.S. Cl. ........................ 364/479; 364/900

[58] Field of Search ........................ 364/479, 478, 401, 403, 364/404, 405, 408, 410, 200 MS File, 900 MS File; 235/379, 380, 381, 385; 340/825.35; 360/15; 369/84, 85

[56] References Cited

U.S. PATENT DOCUMENTS

| | | | |
|---|---|---|---|
| 4,414,467 | 11/1983 | Gould et al. | 235/379 X |
| 4,593,376 | 6/1986 | Volk | 364/479 X |
| 4,597,058 | 6/1986 | Izumi et al. | 364/479 X |
| 4,598,810 | 7/1986 | Shore et al. | 235/381 X |
| 4,647,989 | 3/1987 | Geddes | 235/381 X |
| 4,654,799 | 3/1987 | Ogaki et al. | 364/479 |
| 4,654,800 | 3/1987 | Hayashi et al. | 364/403 X |
| 4,672,554 | 6/1987 | Ogaki et al. | 364/479 |
| 4,674,055 | 6/1987 | Ogaki et al. | 364/410 X |
| 4,677,565 | 6/1987 | Ogaki et al. | 364/479 |

*Primary Examiner*—Joseph Ruggiero
*Attorney, Agent, or Firm*—Kane, Dalsimer, Sullivan, Kurucz, Levy, Eisele & Richard

[57] ABSTRACT

An apparatus for managing a plurality of software vending machines each connected to the apparatus through a communication line and each arranged so that any software program selected by a customer out of a plurality of software programs stored in the machine is duplicated onto an external storing medium. The apparatus communicates with each of the plurality of software vending machines through the communication line. The apparatus stores at least one sotfware program and can detect the frequency of duplication of each program in each of the software vending machines through information sent on the communication line. Software programs are replaced in each of the software vending machines based on their frequency of duplication for a predetermined period of time. The duplicating frequency is corrected so that the detected value of the frequency of duplication is high in inverse proportion to the length of time elapsed from the registration of that program.

4 Claims, 5 Drawing Sheets

APPARATUS FOR MANAGING SOFTWARE BENDING MACHINES

BACKGROUND OF THE INVENTION

1. Field of the Invention

The present invention generally relates to an apparatus for managing software vending machines, and particularly relates to an apparatus for managing software vending machines, in which a software program stored in each of the software vending machines is renewed.

2. Description of the Prior Art

Recently, as personal computers, game machines using personal computers, and the like, become widely used, machines for automatically vending software programs have received practical application. In view of the characteristics of commodities, that is, software programs, such an automatic software vending machine is arranged so that the automatic software vending machine does not sell external storing media, such as ROM packages, magnetic recording tapes, floppy disks, or the like, in which software programs have been individually stored in advance, but sells a software program in such a manner that data forming a software program for sale is stored in advance in the automatic software vending machine per se and the software program is duplicated onto an external recording medium at the time of selling.

There have been proposed various kinds of automatic software vending machines. For example, an automatic software vending machine has been proposed in which a plurality of software programs are stored in advance in a hard disk or the like provided in the machine so to make it possible to sell various kinds of software programs.

In the automatic software vending machine as described above, however, there has been such a problem that the hard disk or the like for storing data forming the software programs for sale has a limit in storage capacity so that there is a limit in the number and kind of software programs which can be registered in the software vending machine. Further, in such a software vending machine, it will cause such a further problem that the demands of society for the software programs cannot be taken into consideration if the software programs for sale are deleted one after one simply in the order of oldness when a new software program is to be registered.

SUMMARY OF THE INVENTION

It is therefore an object of the present invention to solve the foregoing problems in the conventional automatic software vending machines.

It is another object of the present invention is to provide an apparatus for managing software vending machines which can properly manage the arrangement of stock or kind of software programs in the software vending machines.

In order to attain the above objects, according to the present invention, the apparatus for managing a plurality of software vending machines each connected to the apparatus through a communication line and each arranged so that any software program selected by a customer out of a plurality of software programs stored in memory means disposed in the machine is duplicated onto an external storing medium, comprises: communication means for carrying out information communication with each of the plurality of software vending machines through the communication line; storage means for storing at least one software program; duplicating frequency detecting means for detecting frequency of duplicating for every software program in each of the software vending machines through the communication means; and software renewing means for replacing one of the plurality of software programs stored in the memory means in each of the software vending machines selected on the basis of the frequency of duplicating in a predetermined period of time with the software program stored in the software storage means through the communication line.

Preferably, the duplicating frequency detecting means is arranged so that the frequency of duplicating for every software program is corrected to make the detected value of duplicating frequency high in inverse proportion to a length of the time elapsed from registration of the software program.

These and other objects, features, advantages and uses of the invention will become more apparent as the description proceeds, when considered with the accompanying drawings.

DETAILED DESCRIPTION OF THE INVENTION

Prior to the description of a preferred embodiment of the invention, a basic arrangement of the invention will be described by way of example in reference to FIG. 1.

Figure 1:
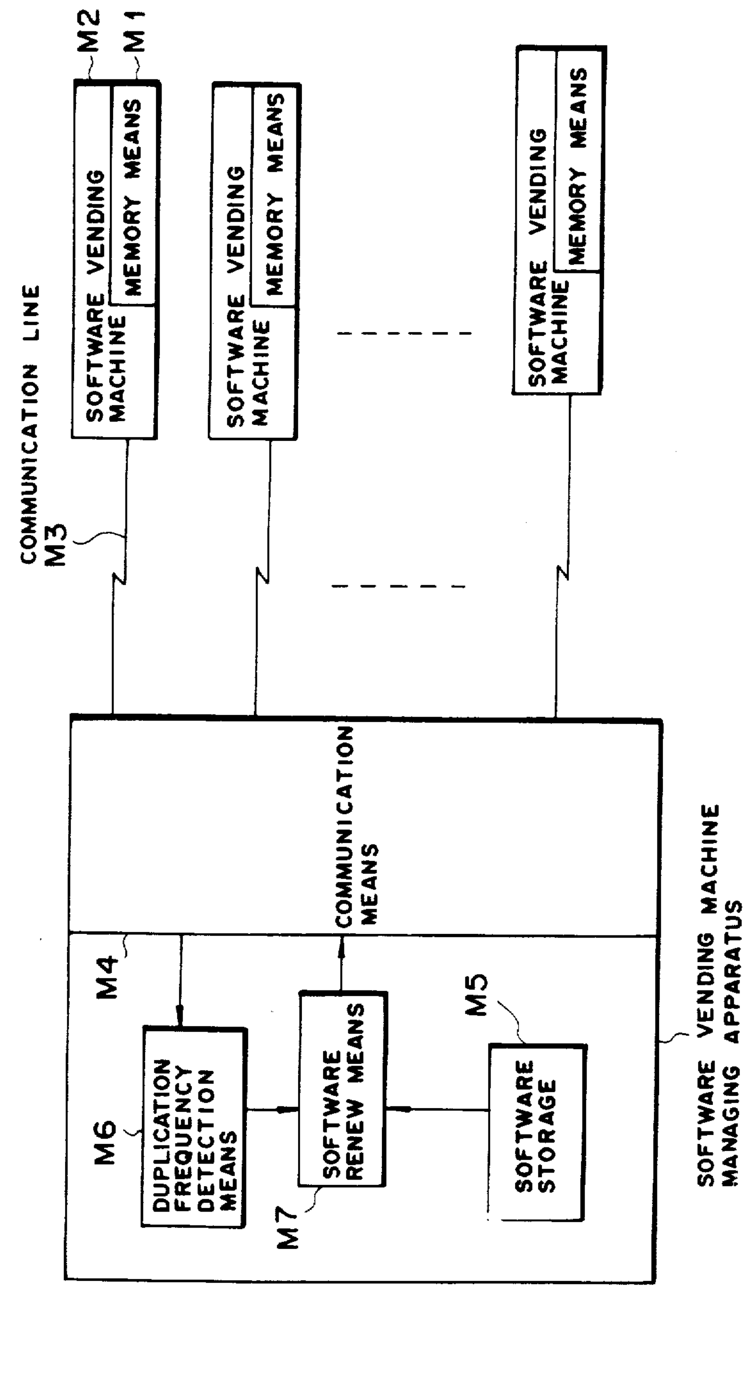
FIG. 1 is a block diagram showing, by way of example, a basic arrangement of the present invention.

In FIG. 1, the software vending machine managing apparatus of the present invention is arranged so as to manage a plurality of software vending machines M2 each connected to the apparatus through a communication line M3 and each arranged so that any software program selected by a customer out of a plurality of software programs stored in memory means M1 disposed in the machine M2 is duplicated onto an external storing medium (not shown). The managing apparatus is provided with communication means M4 for carrying out information communication with each of the plurality of software vending machines M2 through the communication line M3, a software storage device M5 for storing at least one software program, duplicating frequency detecting means M6 for detecting frequency of duplicating for every software program in each of the software vending machines M2 through the communication means M4, and software renewing means M7 for replacing one of the plurality of software programs stored in the memory means M1 in each of the software vending machines M2 selected on the basis of the frequency of duplicating for a predetermined period of time by the software program stored in the software storage device M5.

The thus arranged software vending machine managing apparatus according to the present invention is connected with the plurality of software vending machines M2 through the communication lines M3 so that the communication means M4 performs delivery of information with each of the software vending machines M2 through the communication line M3, and that the duplicating frequency detecting means M6 detects the frequency of duplicating for every software program in each of the software vending machines M2 through the communication means M4, and that the software renewing means M7 replaces one of the plurality of software programs stored in the memory means M1 in each of the software vending machines M2 selected on the basis of the above-mentioned frequency of duplicating for a predetermined period of time by the software program stored in the software storage device M5.

Next, a preferred embodiment of the present invention will be described hereunder more in detail in reference to FIG. 2.

Figure 2:
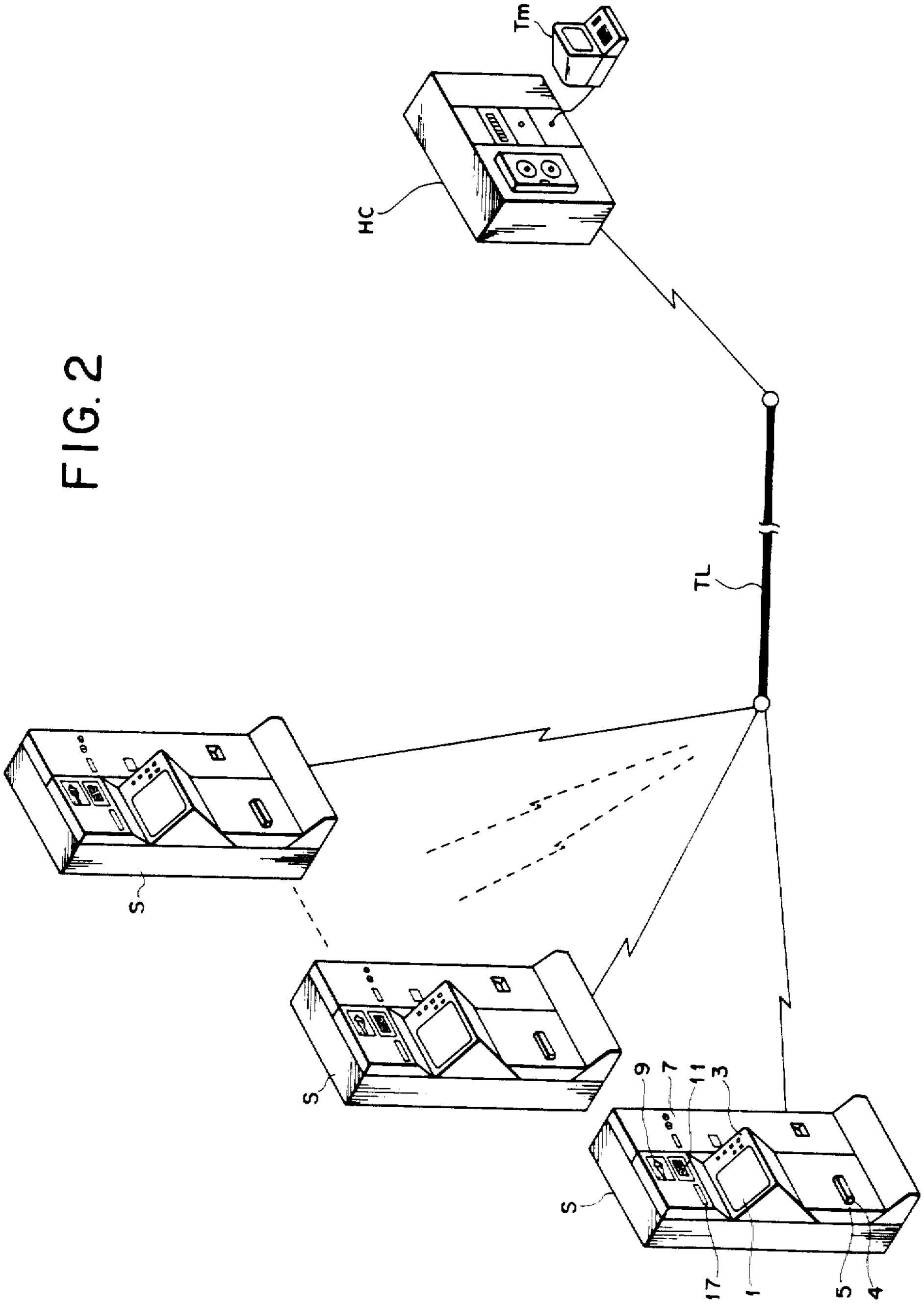
FIG. 2 is a schematic diagram showing the relation between an embodiment of the present invention of the software vending machine managing apparatus according to the present invention and a plurality of software vending machines connected to the managing apparatus.

In FIG. 2, a software vending machine managing apparatus HC according to the invention is connected to a plurality of software vending machines S through a communication trunk line TL. Each of the software vending machines S sells a software program by duplicating data forming the software program onto a selected one of a variety of external storing media, such as a floppy disk, a magnetic recording tape, an ROM cartridge, and the like, in such a way as will be described in detail later. Softwares for sale are sent from the managing apparatus HC through the communication trunk line TL to each of the vending machines S and stored once in a hard disk provided in the software vending machine S. Any one of the software programs for sales selected through the operation by an user is read out to be duplicated. The number of times or frequency of the thus performed duplicating operation, that is, the proceeds of sales, are transmitted to the managing apparatus HC through the communication trunk line TL so as to be managed by the managing apparatus HC. The managing apparatus HC is operated through a terminal Tm.

As shown in FIG. 2, each of the software vending machines S is constituted by a CRT display 1, a keyboard panel 3, a package take-out device 5 for taking out a package 4 enclosing an external storing medium, a money reception/payment managing device 7 for managing receipt of money, change, or the like, a floppy disk drive 9 and a cassette tape recorder 11 each for performing duplicating of a software program, a printer 17 for printing out information with respect to a software program to be duplicated, and so on.

Figure 3:
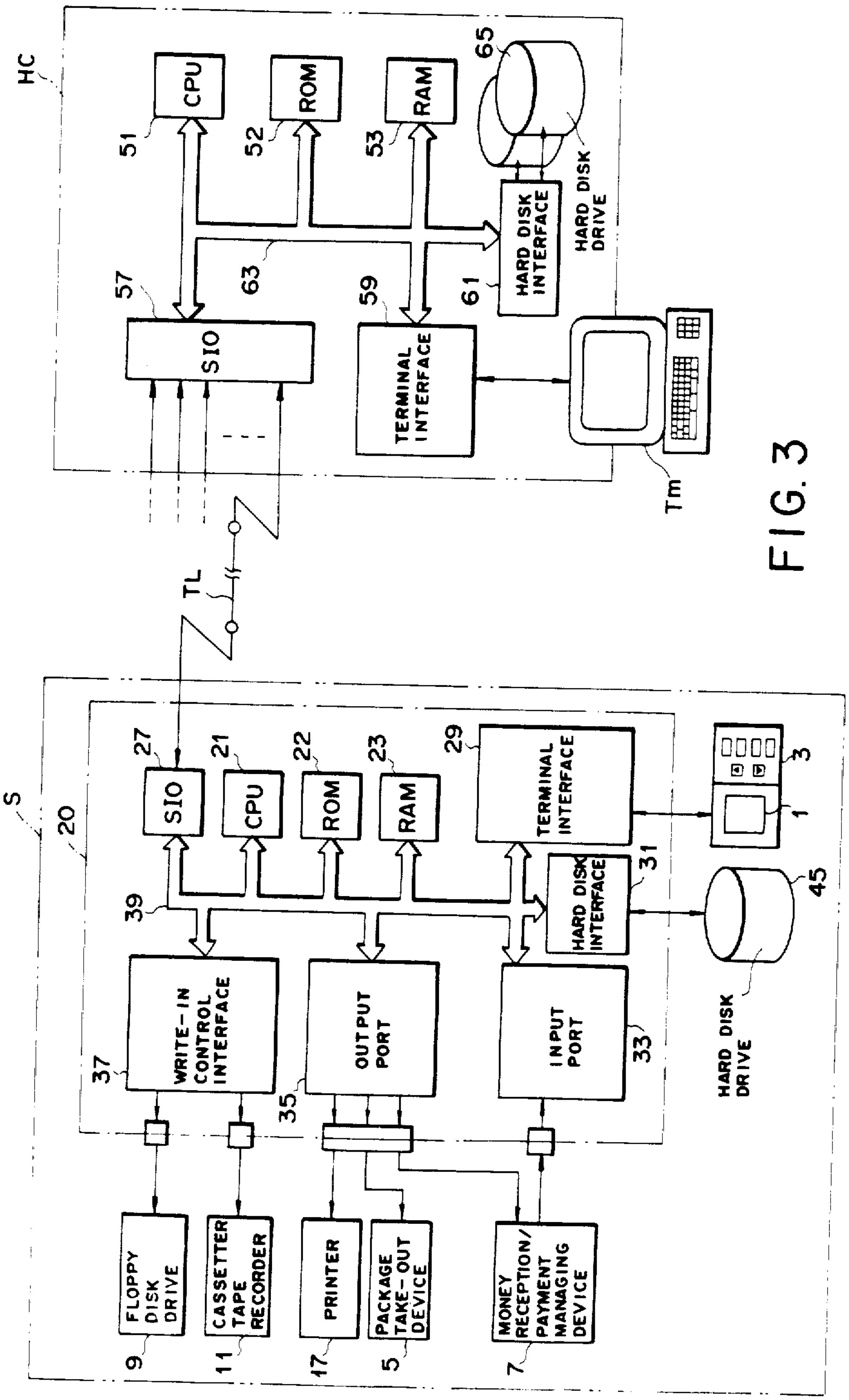
FIG. 3 is a diagram for showing in detail the arrangement of the managing apparatus and one of the software vending machines connected to the managing machine.

Next, description will be made as to the respective arrangement and operation of each of the software vending machines S and the managing apparatus HC. FIG. 3 is a block diagram showing the internal arrangement of one of the software vending machines S and the managing device HC. As shown in the drawing, the above-mentioned various constituent components of each of the software vending machines S are collectively managed and controlled by an electronic control device 20. The electronic control device 20 is constituted in the form of a logic control circuit in which main circuit components such as a CPU 21, an ROM 22, and an RAM 23, and a variety of interfaces for performing delivery of data with the various circuit components, for example, a serial input/output port (SIO) 27, a terminal interface 29, a hard disk interface 31, an input port 33, an output port 35, a write-in control interface 37, each of which per se is well known, are connected to one another through a bus 39.

The SIO 27 is an interface for carrying out delivery of information with the managing apparatus HC through the communication trunk line TL, so that the CPU 21 carries out delivery of data with the managing apparatus HC through the SIO 27 when a new software program is registered to the software vending machine S or when information regarding proceeds of sales is transmitted to the managing apparatus HC. The terminal interface 29 is connected with the CRT display 1 and the keyboard panel 3 to receive the state of operation effected onto six key switches provided on the keyboard panel 3 and to send out data of a picture to be displayed including the name of a software program capable of being duplicated and so on in accordance with the operated key to the CRT display 1 on the basis of a command from the CPU 21.

The hard disk interface 31 is provided to perform delivery of a large quantity of data with a hard disk 45 provided as memory means built in the software vending machine S and to transfer the data to the RAM 23 through DMA (direct memory access). Particularly, the hard disk interface 31 is used to read the hard disk 45 to take out data forming a software program selected by operating keys on the keyboard panel 3 for the preparation of writing the data onto a floppy disk, or the like.

The input port 33 is connected to the money reception/payment managing device 7, so that data as to the amount sent from the money reception/payment managing device 7 is transferred to the CPU 21 through the input port 33.

The output port 35 is connected to the money reception/payment managing device 7, the package take-out device 5, and the printer 17 through a connector, so that the CPU 21 sends various commands to the money reception/payment managing device 7, the package take-out device 5, and the printer 17 through the output port 35 to cause the money reception/payment managing device 7 to output charge, to cause the package take-out device 5 to output the package 4 enclosing an external storing medium, and to cause the printer 17 to print out simple information (quick reference) regarding a software program to be duplicated.

The write-in control interface 37 is connected to the floppy disk drive 9 and the cassette tape recorder 11, so that the CPU 21 sends a command to the floppy disk drive 9 or the cassette tape recorder 11 through the write-in control interface 37 to cause the floppy disk drive 9 or the cassette tape recorder 11 to write data forming a software program for sale, that is, the program and accompanying data of the software program, onto the external storing medium, that is, a floppy disk or a cassette tape, taken out of the package 4 and mounted on the floppy disk drive 9 or the cassette tape recorder 11, respectively.

Similarly to the software vending machine S, the managing apparatus HC is constituted by main circuit components such as a CPU 51, an ROM 52, and an RAM 23, and a variety of interfaces for performing delivery of data with the various circuit components, for example, a serial input/output port (SIO) 57, a terminal interface 59, a hard disk interface 61, each of which per se is well known, are connected to one another through a bus 63. The SIO 57, the terminal interface 59, and the hard disk interface 61 are provided to carry out delivery of data with the plurality of software vending machines S, the terminal Tm, and the hard disk 65, respectively. The respective operations of the SIO 57, the terminal interface 59, and the hard disk interface 61 are the same as those of the SIO 27, the terminal interface 29, and the hard disk interface 31 in the software vending machine S.

Next, by using the respective flowcharts shown in FIGS. 4A and 4B, description will be made hereunder as to the control carried out in the respective software vending machine S and the managing apparatus HC in the embodiment.

Figure 4A:
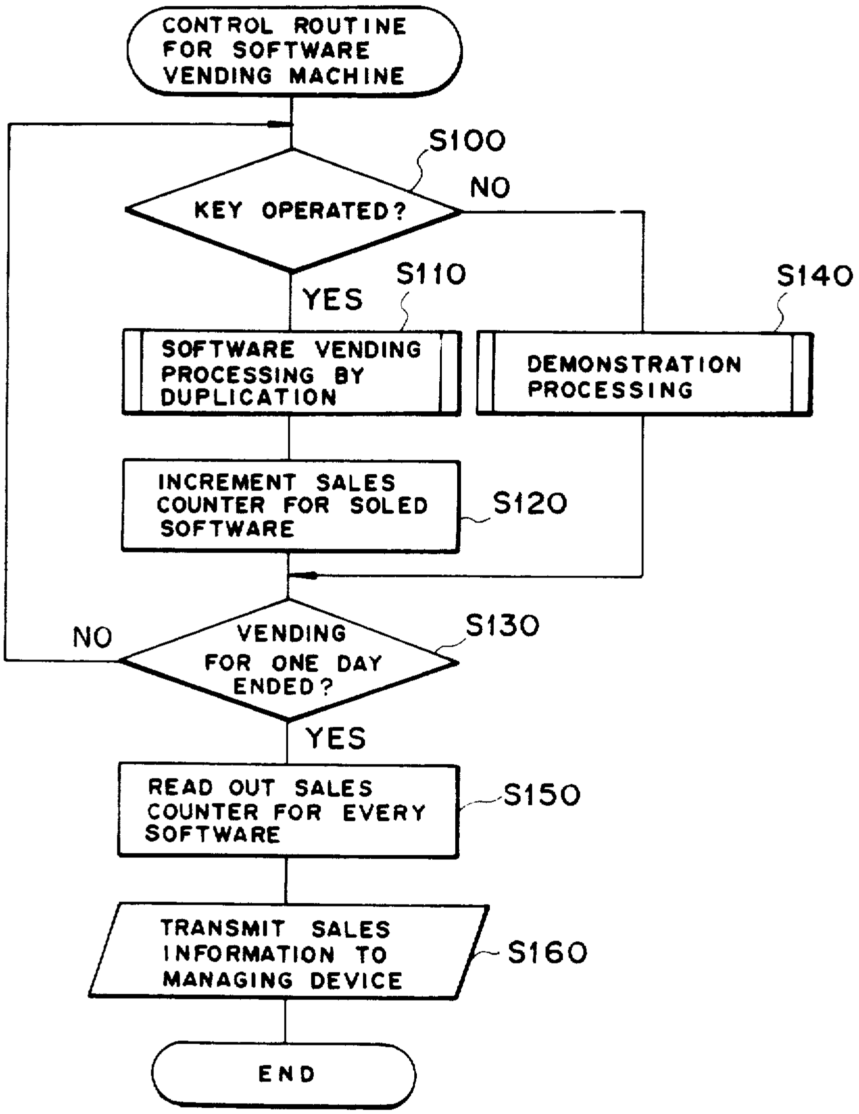
FIG. 4A is a flowchart showing the control routine for the software vending machine.
Figure 4B:
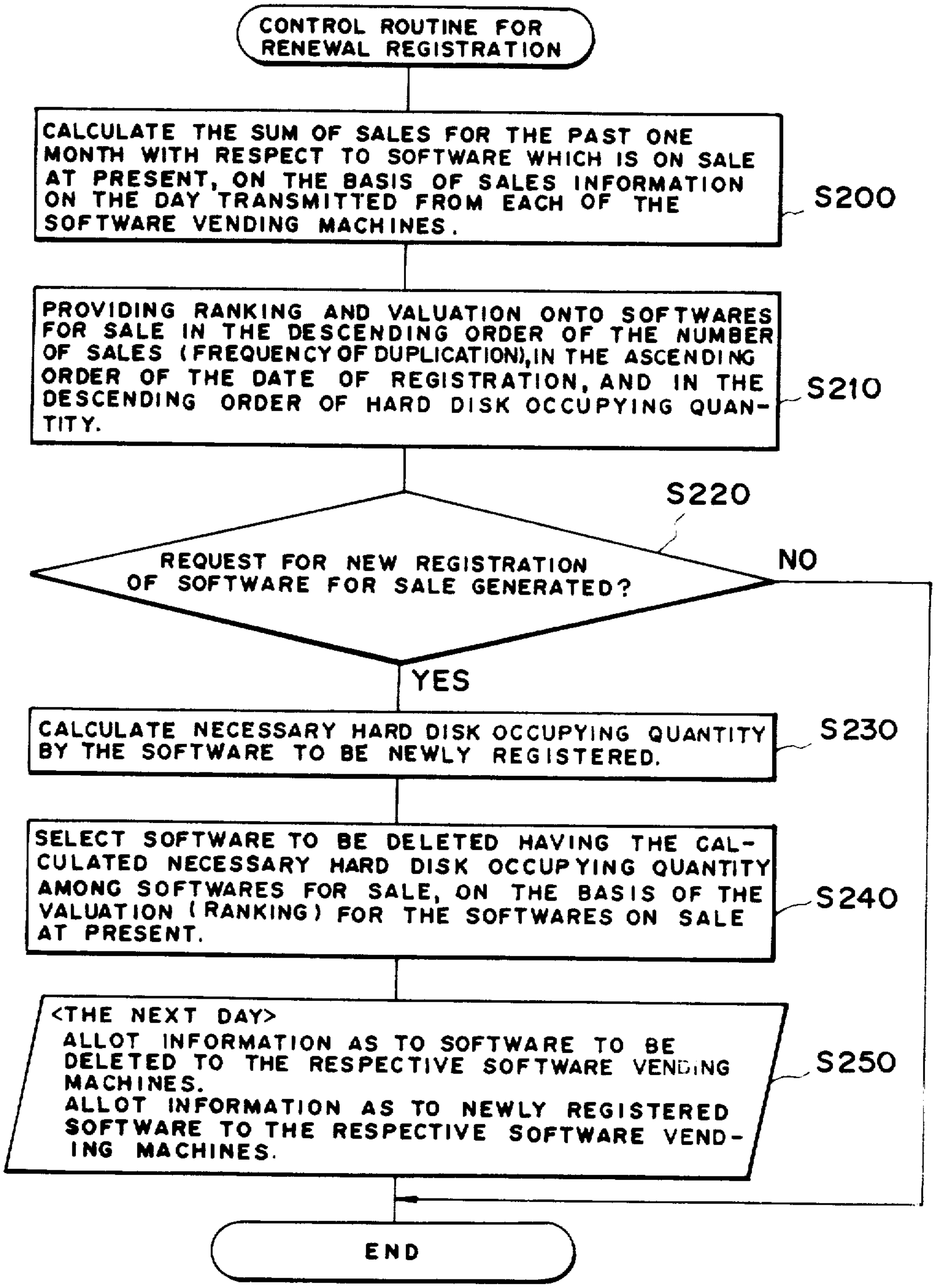
FIG. 4B is a flowchart showing the control routine for renewal registration in the managing apparatus.

In the software vending machine S, after the power source is turned on, the electronic control device 20 executes a predetermined initializing processing, such as an operation to set counters of proceeds of sales to zero as will be described later, and then executes a routine for controlling vending of software programs as shown in FIG. 4A.

First, in the step 100, a judgement is carried out as to whether there is any key input instructing duplicating generated from the keyboard panel 3 or not. If the judgement proves that a user has operated the keyboard panel 3 of the software vending machine S so as to select a software program for sale to be duplicated, or the like, the processing of the software vending control routine advances to the step 110. In the step 110, carried out is processing of vending the selected software program by duplicating the same, that is, such a sequence of processing that the software program for sale selected out of a plurality of software programs stored on hard disk 45 is duplicated onto a floppy disk or a cassette tape which has been taken out of the package 4 and loaded in the floppy disk drive 9 or the cassette tape recorder 11, and at the same time, necessary information is printed out by the printer 17. In the succeeding step 120, processing is carried out such that among the contents of counters of proceeds of sales for the respective software programs and provided in predetermined areas in the RAM 23, only the counter value corresponding to the software program which was sold (duplicated) in the step 110 is increased by one.

In the succeeding step 130, a judgement is made as to whether the sales for that day has ended or not. Means for carrying out the judgement in the step 130 may be constituted by a not-shown timer so that the "end" is decided when the timer indicates that a predetermined point in time has been passed or by a not-shown switch which indicates the "end" when it is operated. If the judgement in the step 130 proves that the sales for that day has not yet ended, the software selling control routine returns to the step 100 in which the judgement is executed again so as to detect existence of key operations. If there is no key operation instructing duplicating processing, the judgement in the step 100 gives an answer "NO". Then, the software selling control routine advances to the step 140 in which demonstration processing is executed. In the demonstration processing, a table of software programs for sale in the software vending machine S, a table of best sellers of the software programs for sale, introduction of newly arrived software programs for sale, and so on, are displayed on the CRT display 1.

In the software vending machine S, the steps 100 through 140 are executed repeatedly. When the judgement in the step 130 proves the sales on that day were terminated, the processing of the software selling control routine is shifted to the steps 150 et seq. In the step 150, processing is carried out so that the respective contents of the counters of proceeds of sales of the software programs stored in the hard disk 45 are read out of the predetermined areas of the RAM 23. In the succeeding step 160, processing is carried out so that information of proceeds of sales including the counter contents read-out in the step 150 is transmitted to the managing apparatus HC through the SIO 27. Then, the routine is shifted to "END" to terminate the control in the software vending machine S.

In the managing apparatus HC, on the other hand, various control is executed. Upon reception of the information of proceeds of sales on that day transmitted from all the software vending machines S, the managing apparatus HC executes a routine for controlling renewal registration as shown in FIG. 4B.

First, in the step 200, processing is carried out so that the information of proceeds of sales on that day transmitted from all the software vending machines are added to the information of all the proceeds of sales up to the day before that day stored in advance in the hard disk 65 to thereby calculate the number of sales, that is, the frequency of duplicating, for the past one month, for every software program now on sale. In the succeeding step 210, processing is carried out so that evaluation is made onto all the software programs for sale by giving ranking to them on the basis of the number of sales of every software program calculated in the step 200, the date of registration of every software program stored in advance in the hard disk 65.

In the succeeding step 220, a judgement is made as to whether a request to register a new software program for sale is generated or not. Such a request to register a new software program is generated when a system operator enters an input through the terminal Tm or the like to inform that there is a software program to be newly registered in each of the software vending machines S, or when the number of times of sales through on-line of any one of the software programs for sale exceeds a predetermined value. If the judgement in the step 200 proves that a request to register is generated, the processing of the routine for controlling renewal registration advances to the step 230 in which processing is carried out to calculate the amount of occupation of area or storage capacity on the hard disk necessary for registration of the software program for sale to be newly registered. In the succeeding step 240, processing is carried out to select a software program to be deleted from the hard disk 45 in order to secure the storage capacity for the registration of the new software program for sale into the hard disk 45 in each of the software vending machines S. In detail, in this processing, a software program to be deleted in order to secure the necessary storage capacity is selected in accordance with the evaluation, that is, the ranking, given to the respective software programs in the step 210, for example, in ascending order of proceeds of sales and among the software programs which have been registered before at least one year. Accordingly, the software renewing means performs its software program renewing operation by selecting one of the registered software programs of a lower duplicating frequency. However, the software programs which have not passed a predetermined period from the registration date thereof are excluded from the object to be replaced.

In the succeeding step 250, processing is carried out so that information of the software program for sale to be deleted is allotted to each of the software program vending machines S from the managing apparatus HC, and upon completion of the deletion of that software program in each of the software vending machines S, a software program for sale to be newly registered is allotted to each of the software vending machines S from the managing apparatus HC. It is preferable to control the software program renewing means in such a manner that means for judging whether there is any empty area enough to write-in a new software program or not on the basis of the previously calculated quantity of occupation is provided so that the software renewing means is caused to perform the software program replacing operation when the judgement proved that there is no sufficient empty area. Having been described above together with the steps 200 through 240 for the sake of explanation, the processing in the step 250 is carried out, in fact, when each of the software vending machines S is turned-on on the day succeeding that day concerned. Upon completion of the processing in the step 250, the processing is shifted to "END" to terminate the execution of the routine.

According to the thus arranged managing apparatus HC of the embodiment as described above, renewal registration of software programs for sale can be carried out in accordance with the total frequency of duplicating, that is, the total proceeds of sales, of the software programs for sale in all the software vending machines connected to the managing apparatus HC, only carrying out registration of a software program for sale to be newly registered.

It is to be understood that the foregoing description is made with respect to a preferred embodiment of the disclosed apparatus and that various changes and modifications may be made in accordance with the present invention without departing from the spirit and scope thereof, such that, for example, in calculating the frequency of duplicating of the software programs for sale, correction is made so as to make the detected value of frequency of duplicating of a software program for sale higher as the lapse of time from the registration of the software program is shorter so that the deletion and renewal of software programs are carried out on the basis of the corrected value of the frequency of duplicating, or such that the frequency of duplicating is calculated in each of the software vending machines.

As described above, by the apparatus for managing software vending machines according to the present invention, it is possible to extremely efficiently perform arrangement of software programs for sale in the software vending machines connected to the apparatus without taking much time. As the result, it is possible to cause each of the software vending machines to demonstrate at maximum its advantage that any one of previously stored software programs is duplicated for sale in response to selection by a customer and to expect further realization of saving in space as well as in resource.

What is claimed is:

1. An apparatus for managing at least one local software vending machine connected to said apparatus through a communication line and arranged so that a software program selected by a customer out of a plurality of software programs stored in memory means disposed in said machine is duplicated onto an external storing medium, said apparatus comprising:

communication means for carrying out information communication with a local software vending machine through said communication line;

storage means for storing at least one software program;

duplicating frequency detecting means for detecting frequency of duplicating for every software program in said software vending machine through said communication means and for correcting the frequency of duplicating for every software program in inverse proportion to a length of the time elapsed from registration of the software program; and software renewing means for replacing one of said plurality of software programs stored in said memory means in said software vending machine selected on the basis of said frequency of duplicating for a predetermined period of time with said software program stored in said storage means through said communication line.

2. An apparatus as defined in claim 1, in which said software renewing means selects one of low duplicating frequency out of said plurality of software programs so as to replace said selected one software program with said software program stored in said storage means through said communication line.

3. An apparatus for managing at least one local software vending machine connected to said apparatus through a communication line and arranged so that a software program selected by a customer out of a plurality of software programs stored in memory means disposed in said machine is duplicated onto an external storing medium, said apparatus comprising:

communication means for carrying out information communication with a local software vending machine through said communication line;

storage means for storing at least one software program;

duplicating frequency detecting means for detecting frequency of duplicating for every software program in said software vending machine through said communication means; and software renewing means for replacing one of said plurality of software programs stored in said memory means in said software vending machine selected on the basis of said frequency of duplicating for a predetermined period of time with said software program stored in said storage means through said communication line, characterized in that said software renewing means does not replace any one or ones of said plurality of software programs which have not passed a predetermined period from a registration date thereof.

4. An apparatus for managing at least one local software vending machine connected to said apparatus through a communication line and arranged so that a software program selected by a customer out of a plurality of software programs stored in memory means disposed in said machine is duplicated onto an external storing medium, said apparatus comprising:

communication means for carrying out information communication with a local software vending machine through said communication line;

storage means for storing at least one software program;

duplicating frequency detecting means for detecting frequency of duplicating for every software program in said software vending machine through said communication means;

software renewing means for replacing one of said plurality of software programs stored in said memory means in said software vending machine selected on the basis of said frequency of duplicating for a predetermined period of time with said software program stored in said storage means through said communication line; and means for detecting an empty area in said memory means, whereby replacement by said software renewing means is performed when a judgment proves that a software program to be newly stored in said memory means cannot be stored in said empty area.

* * * * *